United States Patent Office 3,427,340
Patented Feb. 11, 1969

3,427,340
ALKOXYALKARYLSILANES AND
CONDENSATES THEREOF
Edwin P. Plueddemann, Midland, Mich., assignor to Dow
Corning Corporation, Midland, Mich., a corporation
of Michigan
No Drawing. Filed Feb. 1, 1966, Ser. No. 523,931
U.S. Cl. 260—448.2    11 Claims
Int. Cl. C07f 7/18; C08g 47/00

---

ABSTRACT OF THE DISCLOSURE

The invention provides silanes of the formula $$X_nSiArCH_2OR$$
$$R'_{3-n}$$

and siloxane condensates thereof, where R is a lower alkyl radical, Ar is selected from the group consisting of divalent aryl radicals and divalent aryl ether radicals, X is the hydroxyl or a hydrolyzable group, R' is a monovalent hydrocarbon radical of no more than 18 carbon atoms, and n has a value of 1 to 3, and illustrative silane is

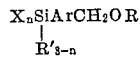

The novel compounds are useful as coating resins, chemical intermediates, and as primers of high thermal stability for the adhesion of siliceous materials and metals to organic resins.

---

This application relates to novel organosilicon compounds which are useful as coating resins, chemical intermediates, and as primers of high thermal stability for the adhesion of siliceous materials and metals to organic resins. One such latter use of a composition of this invention is disclosed in U.S. Patent Application Ser. No. 486,228, filed Sept. 9, 1965. Another is shown in U.S. Patent application Ser. No. 523,901 entitled, Organosilicon Primers for Siliceous and Metallic Materials, filed Feb. 1, 1966.

The compositions of this invention are compounds selected from the group consisting of silanes of the formula $$X_nSiArCH_2OR$$
$$R'_{3-n}$$

and condensates thereof, where

R is a lower alkyl radical,
Ar is selected from the group consisting of divalent aryl radicals and divalent aryl ether radicals,
X is the hydroxyl or a hydrolyzable group,
R' is a monovalent hydrocarbon radical, and
n has a value of 1 to 3.

R can be any lower alkyl radical such as methyl, ethyl, isopropyl, or butyl.

Ar is any divalent aryl radical such as phenylene, biphenylene,

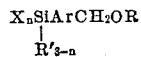

or

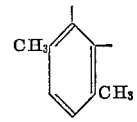

or any divalent aryl ether radical such as

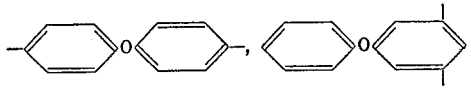

or

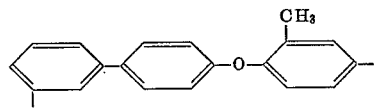

where both free valences are attached to aryl radicals.

X can be the hydroxyl group or any hydrolyzable group, e.g., alkoxide groups such as methoxide, ethoxide, propoxide, isohexoxide, and cyclohexoxide; halogen groups such as chloride, bromide, and fluoride; acyloxy groups such as acetate, propionate, and butyrate; ketoxime groups such as

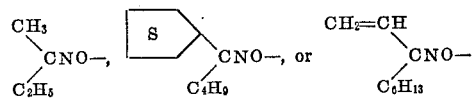

the amino group, and the isocyanate group.

R' is any monovalent hydrocarbon radical of no more than 18 carbon atoms, e.g. methyl, isobutyl, 2-ethylhexyl, dodecyl, octadecyl, cyclohexyl, vinyl, allyl, phenyl, xenyl, 2-phenylpropyl, and tolyl.

The compositions of this invention can be made by reacting a silane of the formula $$X_nSiArCH_2Cl$$
$$R'_{3-n}$$

with RONa in a solvent such as methanol, where the symbols are as defined above. The above starting materials can be made by ordinary organic syntheses which are obvious to the skilled chemist.

The compositions of this invention can also be made by preparing a Grignard reagent from ROCH$_2$ArBr and then reacting that with a silane of the formula $$X_nSiCl$$
$$R'_{3-n}$$

where the symbols are defined above.

Examples of the silanes which are within the scope of this invention are

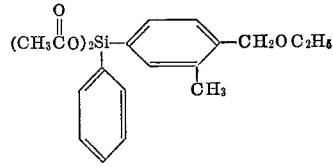

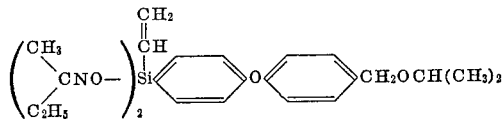

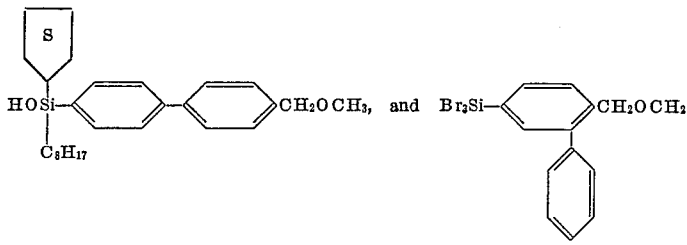

The condensates of the silanes of this invention generally form spontaneously upon exposure of the silanes to moisture by the well-known mechanisms of condensation of hydrolyzable silanes. During the condensation process, siloxane bonds are formed between silicon atoms, replacing the hydroxyl and hydrolyzable groups.

The condensation products can be polymers of the average unit formula

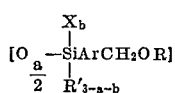

where $a$ has an average value of 1 to 3 and $b$ has an average value of 0 to 2, the sum of $a$ and $b$ being from 1 3, and the other symbols are defined above.

Examples of these condensation products are:

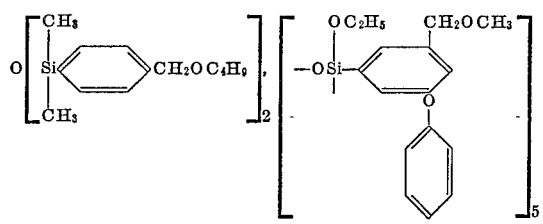

and

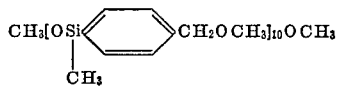

The following examples are illustrative only and should not be construed as limiting the invention which is properly dilineated in the appended claims.

Example 1

(a) A flask was charged with 100 ml. of tetrahydrofuran and 4.8 g. of magnesium turnings. The flask was flushed with $N_2$, and 40 g. of

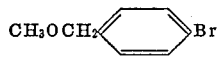

was slowly added with stirring while the mixture was heated to reflux in the presence of a few iodine crystals as a reaction initiator. A rapid exothermic reaction took place, the

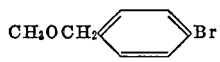

being added at such a rate as to maintain the reaction temperature at about 70° C.

After the addition was complete, reflux was continued for 2 hours.

In another flask there was placed 60 g. of methyltrichlorosilane. To this there was slowly added the filtered, cooled product of the above reaction. After the addition, the mixture was refluxed for two hours. The mixture was cooled, filtered, and distilled to recover 16.2 g. of a product of the formula

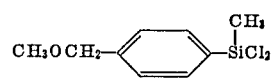

B.P. 78–80° C. at 1.5 mm. of Hg pressure, neutral equivalent, 123.5.

(b) When the product of experiment (a) is applied to chopped glass fibers, composites made at 550° C. from the glass and polystyrene having a softening temperature of 190° F. possess greatly improved flexural and compressive strength and improved hydrolytic stability over composites made from untreated glass fibers.

Example 2

To 169.7 g. of mixed isomers (ortho, meta, and para) of

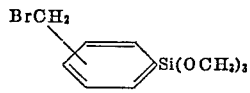

there was added 35 g. of sodium methoxide in 600 ml. of methanol. The mixture was refluxed for 1 hour. The methanol was then removed by stripping, and the residue was filtered to remove the sodium bromide byproduct to recover 80 g. of crude product.

Distillation on a spinning band column produced a fraction which was a mixture of isomers of the structure

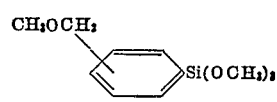

B.P. 91° C. (0.45 mm.), $n_D^{25}$ 1.4788, $d_4^{25}$ 1.081. A portion of this product was hydrolyzed, spread on an aluminum plate, and heated for one hour at 100° C. to give a hard, stable film which was a polymer of

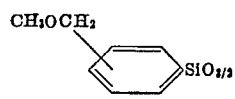

units.

Example 3

When the following Grignard reagents are reacted with the following silanes, the following products are formed:

| Grignard reagent | Silane | Product |
|---|---|---|
| (a) 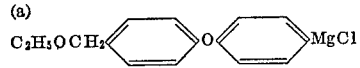 | $ClSi(OC_3H_7)_2$ 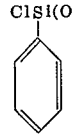 | 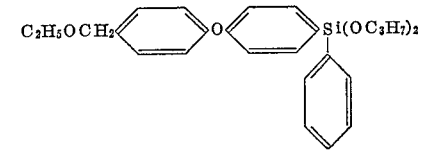 |
| (b) 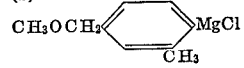 | $C_{10}H_{21}SiCl_3$ | 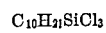 |
| (c) 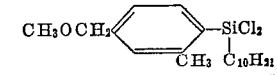 | $SiCl_4$ | 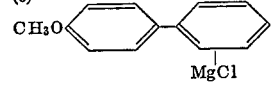 |

These products, and their hydrolyzates, all make superior primers for the adhesion of poly(ethylenediamine adipate) to silicone rubber when they are placed on the silicone rubber in a 10% solution of isopropanol, and the solvent is allowed to dry; and the molten thermoplastic is then applied to the silicone rubber at a temperature of 600° F.

That which is claimed is:

1. A compound selected from the group consisting of silanes of the formula $$X_nSiArCH_2OR$$
$$R'_{3-n}$$

where

R is a lower alkyl radical,
Ar is selected from the group consisting of divalent aryl radicals and divalent aryl ether radicals, the radical having no more than 18 carbon atoms,
X is the hydroxyl or a hydrolyzable group,
R' is a monovalent hydrocarbon radical of no more than 18 carbon atoms, and
n has a value of 1 to 3.

2. The silane of claim 1 of the formula

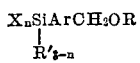

3. The silane of claim 1 of the formula

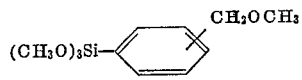

4. The silane of claim 1 where R' is methyl.
5. The silane of claim 1 where R is methyl.
6. The silane of claim 1 where X is methoxy.
7. The silane of claim 1 where X is chlorine.
8. The silane of claim 1 where Ar is phenylene.
9. The silane of claim 1 where n is 3.
10. A siloxane consisting essentially of units of the formula

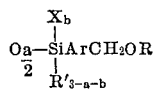

where

R is a lower alkyl radical,
Ar is selected from the group consisting of divalent aryl radicals and divalent arylether radicals, the radicals having 18 carbon atoms or less,
X is the hydroxyl or a hydrolyzable group,
R' is a monovalent hydrocarbon radical of no more than 18 carbon atoms,
a has an average value of from 1 to 3, and
b has an average value of from 0 to 2, the sum of a and b being from 1 to 3.

11. The siloxane of claim 10 where R is a methyl radical, Ar is a phenylene radical, and R' is methyl.

References Cited

UNITED STATES PATENTS

| 2,423,497 | 7/1947 | Harmon | 260—448.8 XR |
| 2,872,434 | 2/1959 | Barnes | 260—448.2 XR |
| 3,172,899 | 3/1965 | Bailey | 260—448.8 XR |

CHARLES B. PARKER, *Primary Examiner.*

S. T. LAWRENCE III, *Assistant Examiner.*

U.S. Cl. X.R.

260—448.8, 46.5